3,184,308
PROCESS FOR TREATING LEUCOCYANIDE DYE IMAGES AND PRODUCT THEREOF
Meyer S. Agruss, 2849 W. Sherwin Ave., Chicago, Ill.
No Drawing. Filed May 23, 1962, Ser. No. 196,897
13 Claims. (Cl. 96—27)

The present invention relates to the treatment of leucocyanide dyes to render such dyes insensitive to becoming transformed from the colorless condition to the colored condition, and vice versa. The invention is particularly directed to photosensitive compositions comprising short wave length radiation-sensitive leucocyanide dyes which are rendered insensitive to alteration in the invention. Thus, the leucocyanide dyes are rendered insensitive to short wave radiation, long wave radiation, and even moderate acid or alkaline treatment. In this way, a print comprising areas of colorless leucocyanide dye and areas of colored leucocyanide dye is rendered resistant to alteration because the colorless areas cannot be converted to colored condition by exposure to short wave length radiation or acid treatment and the colored areas cannot be erased by alkaline treatment. As will be evident, this is of considerable importance in providing prints which are resistant to alteration and hence, useful as archival documents or wherever some reasonable assurance against addition or erasure subsequent to original printing is desired as in legal documents.

The use of ultraviolet light-sensitive leucocyanide dyes to provide copying paper of the nature of blueprint paper is known. These papers are exposed by subjecting them to ultraviolet light through a transparency or stencil to produce a copy in which the colorless leucocyanide dye is converted to the colored form wherever it is struck by the ultraviolet light. The ultraviolet light causes the dye to dissociate and the dissociated dye is maintained in its dissociated and colored form by an agent termed an "activator" by the art. However, the copy so-produced is subject to alteration in many ways. Thus, the colored portions can be rendered colorless by exposure to alkaline materials as by treatment with ammonia gas or aqueous and non-aqueous solutions of ammonium hydroxide or sodium hydroxide. Similarly, the colorless portions may be converted to the colored condition by a further exposure to ultraviolet light or by treatment with dilute acids. In the invention, the exposed copying paper with its image thereon is treated to render the leucocyanide dye resistant to the alterations indicated so that the copying paper will be better adapted to provide permanent and alteration-resistant documents.

Similarly, the use of leucocyanide dyes in the dyeing of fabrics has suffered from the tendency of the colored form of the dye to fade. The invention permits the leucocyanide dyes to be converted to the colored form and then modified to possess greater resistance to fading.

In the invention, the leucocyanide dye in its colored form or in its colorless form, and preferably in both forms as in a print such as a blueprint, is treated with an organic compound to form a chelate. It has been found that when the colorless leucocyanide dye is chelated, it remains colorless and is rendered insensitive to becoming colored upon radiation exposure or acid treatment despite the fact that such exposure or treatment will convert the dye to its colored form in the absence of chelation of the dye. It has also been found that when the colored form of the dye is chelated, it remains colored and is rendered insensitive to reversion to the colorless form, even upon subjection to alkaline materials such as ammonia gas which will normally convert the dye back to its colorless form.

Numerous "activators" are known to the art for maintaining the leucocyanide dye in its dissociated colored form upon exposure to short wave length radiation. These known "activators" are illustrated by nitriles, such as acetonitrile, primary and secondary aromatic amines, aromatic carbinols, aliphatic carboxylic acids and amides of such acids. In accordance with the invention, it has been found that the leucocyanide dye is chelated to provide the alteration-resistant results desired by the invention, irrespective of the "activator" which is selected to enable the leucocyanide dye to exhibit its color upon short wave length radiation exposure and irrespective of the efficacy of the "activator" to produce a color which does not fade in the dark or a colorless background resistant to darkening upon actinic light exposure or acid contamination.

More particularly, a photosensitive coated base, such as paper carrying a coating of leucocyanide dye in its colorless form together with an agent capable of maintaining the dissociated form of the dye, is exposed to ultraviolet light to provide a print having colorless areas comprising colorless leucocyanide dye and colored areas comprising leucocyanide dye in its colored form. This print is then treated over its entire surface with an organic chelating agent to convert both the colorless and colored forms of the dye into a chelate which resists further transformation of either form of the dye to the other form of the dye.

The chelate may be broken by a very vigorous treatment, such as provided by nitric acid, but such an extensive treatment is damaging to the substrate of the print, revealing the fact of alteration.

The preferred organic chelating agents are chelatable organic derivatives of a group IV B metal, e.g., titanium, zirconium and hafnium. These are desirably in the form of tetra-substituted organic compounds and most preferably in the form of esters of the metal having the formula:

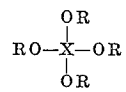

in which X is titanium, zirconium or hafnium and R is any organic radical.

The group IV B metal organic tetraesters may also be used in admixture with one another and whether used alone or in admixture, these tetraesters react with the leucocyanide dye in its colorless form or its colored form to produce a valence bonded complex.

The insensitizing agents used in the invention are desirably applied from organic solvent solution, referred to as an insensitizer solution, but the specific manner of physical application of the insensitizing agent to the leucocyanide dye is not a primary feature of the invention.

Thus, the invention is illustrated by the application to prints comprising leucocyanide dye of a dilute solution, e.g., about 5% by weight, in toluene, of one or more of the following compounds: tetra-n-butyl titanate; tetra-2-ethyl hexyl titanate; stearyl titanate; octylene glycol titanate; triethanol amine titanate; titanium lactate; tetra-isopropyl titanate; titanium acetyl acetonate; zirconium lactate, tetra-isopropyl zirconate, tetra-n-butyl zirconate and zirconium acetyl acetonate. While these organic derivatives are preferred, the invention is not limited to these specific preferred compounds and the corresponding compounds of hafnium, such as tetra-isopropyl hafniate may be used.

Numerous leucocyanide dyes may be used in accordance with the invention so long as the dye is convertible from an essentially colorless form to a colored form. Preferably, the leucocyanide dye is one which is converted to the colored form by exposure to short wave length radiation. Many such dyes are known and these generally fall within the class of leucocyanides of triarylmethane dyes. The invention preferably employs the triphenylmethane leucocyanide dyes which have the structural skeleton:

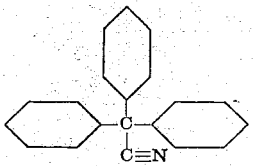

wherein one or more of the phenyl groups is substituted with a primary, secondary or tertiary amine group, other additional substituents on the phenyl groups being known and permissible. The triphenyl methane leucocyanide dyes are preferred because these are quite sensitive to short wave length radiation.

Many of the best known triphenylmethane leucocyanide dyes are hydrophobic and these are well suited to being insensitized by the present invention.

Among the preferred hydrophobic leucocyanide dyes which may be included are the leucocyanide of pararosaniline, the leucocyanide of malachite green, the leucocyanide of crystal violet, the leucocyanide of rosaniline, the leucocyanide of new fuchsine and the like leucocyanides.

Various hydrophilic triphenylmethane dye cyanides are also known and these are also insensitized by the invention. Thus, while hydrophobic dyes are preferred, hydrophilic dyes may be used and these are illustrated by the leucocyanides of Formyl violet, Ethyl green and Aurin.

The leucocyanide dyes having the structural skeleton previously indicated wherein one or more of the phenyl groups is substituted with an amino group, mono- or dialkyl amine group, and wherein the phenyl groups may additionally be substituted with halogen, sulphonic acid, etc., are known in the art. Dyes of this general type illustrated above in which the phenyl groups can be replaced by naphthyl groups are also adapted to be insensitized by the invention. Suitable dyes containing naphthyl groups are illustrated by the leucocyanide of Victoria Blue R and the leucocyanide of Night Blue.

Various organic solvents can be utilized for the application of the insensitizing agent. Low boiling or volatile alcohols, ketones, ethers, esters and hydrocarbons are available. Typical examples of organic solvents are methyl alcohol, acetone, methyl ethyl ketone, dioxane, ethyl acetate, benzene, toluene, and mixtures such as 50/50 toluene/ethyl acetate.

The proportions of the ingredients are variable within reasonable limits. Concentrations of insensitizing agent in toluene of from 0.05–10% are illustrative of suitable concentrations. Of course, even pure insensitizing agent may be used. A coating of 3 mils wet is typical of low concentration and a coating of 0.5 mil is typical for application of a 5% solution.

If desired, the insensitizing solution may include one or more synthetic resins as film-forming materials or thickening agents such as, for example, sucrose acetate isobutyrate, and synthetic resins such as methyl methacrylate, polyvinyl acetate, cellulose acetate, polyethylene, butadiene/styrene copolymers, butadiene/acrylonitrile copolymers, acrylic and methacrylic ester polymers and copolymers. Thus, the insensitizing agent may be applied from organic solvent solution containing a thickening agent or film-forming resin of the type noted above.

It is frequently desirable to employ a leucocyanide dye coated paper in which the leucocyanide dye and the "activator" therefor are applied to the paper in a film-forming synthetic resin such as those indicated hereinbefore to provide a paper sensitive to ultraviolet light exposure and having a clear and glossy surface. When these are exposed to ultraviolet light to produce a print, the clear, glossy surface provides good clarity of reproduction, but it makes it somewhat difficult to write over the print as with a pencil. To facilitate writing on the print surface, and as a feature of the invention, the solution of insensitizing agent is modified to include a proportion of a flatting agent which is left behind when the volatile solvent component of the solution evaporates to provide a surface which is better adapted to receive a pencil impression. Suitable flatting agents are finely divided silica, barium sulfate and titanium dioxide and these may be used in proportions of from 1–50% by weight of the solution, preferably from 5–30% by weight of the solution. When a flatting agent is used, the solution of insensitizing agent preferably also includes a minor amount of film-forming synthetic resin such as those previously mentioned to anchor the particles of flatting agent on the print surface.

A feature of the invention is the production of either blueprints or white prints from an original tracing, as desired, and using a simple piece of equipment. As is well known, architects and engineers frequently produce their engineering drawings by the application of ink, or more frequently pencil, to a transparent sheet such as tracing paper or tracing cloth. Prints are made from these original drawings. On some occasions, a blueprint is desired in which the print is characterized by white (or light colored) lines on a dark background. In other instances, a white print is desired which is characterized by dark lines on a white (or light colored) background. The present invention, using a photosensitive coated paper, produces a blueprint by a direct exposure to ultraviolet light through the original tracing. In addition, the invention provides, as a feature thereof, the production of white prints in the following manner.

The original tracing (dark lines on a transparent or transluscent sheet) is used to produce a transparent blueprint. The production of the transparent blueprint is simply effected by exposing a transparent sheet including leucocyanide dye and activator to ultraviolet light through the original tracing so that the portions underlying the dark lines on the original tracing remain unexposed and colorless while the remainder of the transparent sheet becomes colored and hence possesses a substantial opacity to ultraviolet light. The transparent sheet used to produce the transparent blueprint may be nylon, cellulose acetate, etc., which includes or which is coated with the leucocyanide dye and activator. This transparent blueprint is not useful directly in the production of white prints because the colorless areas thereof are still sensitive to ultraviolet light exposure. By coating or spraying the transparent blueprint in accordance with the invention to insensitize the colored and colorless portions of leucocyanide dye thereon, the ultraviolet light-sensitive nature of the transparent blueprint is overcome to provide what may be referred to as a negative master which is insensitive to ultraviolet light. This negative master may then be used as an original to produce white prints by exposing a sheet of light-sensitive paper to light through the negative master to thereby expose only those areas which underlie the colorless portions of the negative master and thereby cause the development of color only in those areas. When the light-sensitive paper which is used is an ultraviolet light-sensitive blueprint paper comprising leucocyanide dye and "activator" therefor, and the exposure is to ultraviolet light, one has the valuable result of the production of blueprints or white prints from an original tracing as desired, using a single piece of simple equipment providing ultraviolet light exposure without any treatment to develop the image. Thus, the same blueprint paper normally used to provide blueprints is used with the negative master to provide white prints and, irrespective of the production of blueprint or white print, the print may be rendered resistant to alteration by the present invention.

The invention is illustrated in the examples which follow:

Example 1

A solution is made of 5 grams of paraosaniline leucocyanide in 50 ml. of toluene, 50 ml. of acetonitrile and 100 ml. of N-methylacetamide. Twenty pound water leaf paper is impregnated with this solution and the toluene and acetonitrile evaporated in dry air. The resulting paper is sensitive to ultraviolet light of wave lengths shorter than 3300 Angstrom units and prints out a red image on exposure thereto.

The exposed print is sprayed or roller coated with a solution of toluene containing 2% by weight of dissolved tetra-n-butyl titanate, the solution being deposited as a wet film having a thickness of about 1 mil on the surface of the print. Prior to being sprayed with the titanate insensitizing solution, the print is sensitive to further exposure to ultraviolet light to cause the colorless dye to turn red and is also sensitive to 28% ammonium hydroxide solution and to 0.5 N sodium hydroxide to cause the red image to become colorless and to 0.5 N hydrochloric acid to cause the colorless dye to turn red. After being coated with the 2% titanate solution, the toluene evaporates to provide a print which is no longer sensitive to ultraviolet light, to 28% ammonium hydroxide, to 0.5 N sodium hydroxide or to 0.5 N hydrochloric acid in that no significant color transformation follows any of these treatments.

Example 2

Example 1 is repeated using each of tetra-isopropyl titanate; titanium acetyl acetonate; zirconium lactate; tetra-2-ethyl hexyl titanate; stearyl titanate; octylene glycol titanate; triethanol amine titanate; titanium lactate; tetraisopropyl zirconate; tetra-n-butyl zirconate; zirconium acetyl acetonate; and tetra-isopropyl hafniate as the insensitizing agent in place of the tetra-n-butyl titanate of Example 1. Essentially the same insensitization is obtained.

Example 3

A solution is made to contain 0.5 part by weight of pararosaniline leucocyanide, 9.5 parts by weight of diethylacetamide, and 10 parts by weight of sucrose acetate isobutyrate dissolved in 80 parts by weight of a 50/50 weight ratio mixture of toluene/ethyl acetate. This solution is coated upon paper and dried by baking for 15 seconds at 250° F. Exposure of the dry coated paper to ultraviolet light through a stencil or original tracing produces, within a few seconds, a conversion of the colorless dye to its colored condition. The areas of the coated paper which are unexposed and which, hence, contain dye which is still in its colorless form, remain sensitive to ultraviolet light and also to acid treatment with 0.5 N hydrochloric acid. Moreover, the exposed areas which contain the dye in its colored form can be rendered colorless by converting the colored form of the dye to its colorless form by treatment with 28% ammonium hydroxide or 0.5 N sodium hydroxide.

When the exposed print is subjected to spraying or roller coating with a 2% by weight toluene solution of any of the titanates, zirconates or hafniate listed in Examples 1 and 2 (1 mil wet film thickness), the print becomes insensitive to color transformation upon prolonged exposure to ultraviolet light or as a result of treatment with said solutions of ammonium hydroxide, sodium hydroxide and hydrochloric acid.

Example 4

Example 3 is repeated using 5 parts by weight of methyl methacrylate polymer in place of the 10 parts by weight of sucrose acetate isobutyrate used in Example 3. Essentially the same results are obtained.

Example 5

Examples 1–4 are repeated using 0.5% and 5% toluene solutions containing the insensitizing agent in place of the 2% solutions previously used. Essentially the same results are obtained.

Example 6

Examples 1–5 are repeated using the following agents for maintaining the dissociation of the leucocyanide dye:
(1) Phenylacetonitrile
(2) Tri-o-cresyl phosphate
(3) Aniline
(4) Phenylmethyl carbinol
(5) Polyethylene glycol (average molecular weight of 400)

In each instance, the leucocyanide dye becomes colored upon exposure to ultraviolet light within a relatively short period of time, but the print remains sensitive to ultraviolet light and also to alkaline and acid agents as indicated hereinbefore. When insensitizing solution is coated thereon and the carrying solvent evaporated, the print becomes insensitive to prolonged exposure to ultraviolet light and resists color transformation when treated with the acid and alkaline agents previously mentioned.

Example 7

Examples 1–6 are repeated using different leucocyanide dyes, namely, crystal violet leucocyanide; new fuchsine leucocyanide; Formyl violet leucocyanide; and Victoria Blue R leucocyanide. Essentially the same results are obtained.

Example 8

Examples 1–7 are repeated with the inclusion in the insensitizing solution of 15% by weight of finely divided silica as flatting agent. When the solvent evaporates, the finely divided silica remains behind, dulling the surface of the print and facilitating writing thereupon with a pencil, especially when a resinous component is included in the leucoyanide dye-containing coating.

Example 9

Example 8 is repeated with the inclusion of 5% by weight of methyl methacrylate polymer in the insensitizing solution. The flatting agent included in Example 8 is more securely anchored to the print by the presence of the polymer.

Example 10

Example 9 is repeated using 10% by weight of cellulose acetate butyrate in place of the methyl methacrylate polymer. Essentially the same results are obtained.

Example 11

Example 3 is repeated with the exception that the leucocyanide dye-resin solution is applied over a clear sheet of cellulose acetate to provide an ultraviolet light-sensitive clear film which is directly useful for the preparation of a negative transparency.

When short wave length radiation is referred to herein, it will be understood that radiation having a wave length of up to about 3600 Angstrom units is intended, preferably a wavelength of up to 3400 Angstrom units.

The invention is defined in the claims which follow.

I claim:
1. A process for treating leucocyanide dyes on a substrate, said dyes being convertible by exposure to short wave length radition from a colorless form to a colored form to render such dyes insensitive to such conversion upon short wave length radiation exposure comprising contacting said dye on said substrate with a tetra-ester having the formula:

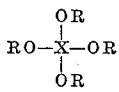

in which X is selected from the group consisting of titanium, zirconium, hafnium and mixtures thereof, and R is an organic radical, to react said tetra-ester with said dye to provide a valence bonded complex.

2. A process for producing a print resistant to alteration comprising exposing to short wave length radiation portions of the surface of a sheet of material carrying a photosensitive composition comprising leucocyanide dye convertible by exposure to short wave length radiation from a colorless form to a colored form and an agent for maintaining said dye in its dissociated colored form to thereby provide a print, and contacting the surface of said print with a chelatable organic derivative of a group IV B metal to form a chelate with both the colorless and the colored forms of said dye.

3. A process for irreversible photographic printing by exposure to short wave length radiation having a wave length of up to 3600 Angstrom units comprising exposing a substrate carrying colorless triarylmethane leucocyanide dye to short wave length radiation to transform areas on said substrate to a colored condition and subsequently applying a coating comprising an organic derivative of a group IV B metal capable of forming a chelate with said dye over said substrate to insensitize said dye to further color transformation.

4. A process for irreversible photographic printing to provide a printed surface which is adapted to receive a pencil impression comprising, providing a substrate coated with a layer of clear film-forming resin containing colorless triarylmethane leucocyanide dye and an agent for maintaining said dye in its dissociated colored form, exposing said coated surface to short wave length radiation to transform areas of said coating to a colored condition, and subsequently overcoating said exposed coated surface with an organic solvent solution containing film-forming resin, a flatting agent and an organic derivative of a group IV B metal capable of forming a chelate with said dye.

5. A process of producing a white print from a positive transparency comprising, exposing a transparent sheet including a colorless leucocyanide dye convertible by exposure to short wave length radiation from a colorless form to a colored form and an agent for maintaining said dye in its dissociated form to short wave length radiation through said positive transparency to thereby produce a negative transparency comprising short wave length transparent areas containing colorless dye and short wave length radiation absorbent areas containing colored dye, contacting the leucocyanide dye of said negative transparency with a chelatable organic derivative of a group IV B metal to form a chelate with said dye to thereby render said dye resistant to further color transformation by exposure to short wave length radiation and provide an insensitized negative transparency, and then exposing a sheet of material carrying a photosensitive composition comprising colorless leucocyanide dye convertible by exposure to short wave length radiation from a colorless form to a colored form and an agent for maintaining said dye in its dissociated colored form to short wave length radiation through the said insensitized negative transparency to thereby form a white print corresponding with the original positive transparency.

6. An alteration-resistant print comprising a sheet of material carrying a photosensitive composition comprising colorless triarylmethane leucocyanide dye and an agent for maintaining said dye in its dissociated colored form, portions of the surface area of said sheet carrying said dye in its colorless form and other portions of the surface area of said sheet carrying said dye in its colored form, said dye in both its colorless and colored forms being chelated with a chelatable organic derivative of a group IV B metal to be resistant to transformation from one form to the other.

7. An alteration-resistant print comprising a sheet of material coated with a photosensitive composition comprising colorless triarylmethane leucocyanide dye and an agent for maintaining said dye in its dissociated colored form uniformly distributed in a film of transparent resin, portions of said film containing said dye in its colorless form and other portions of said film containing said dye in its colored form, said film being overcoated with a solution of a group IV B metal organic tetra-ester to render the colorless and colored portions of said film resistant to transformation between the colorless and colored conditions.

8. An alteration-resistant print receptive of pencil impressions comprising a sheet of paper coated with a photosensitive composition comprising colorless triarylmethane leucocyanide dye and an agent for maintaining said dye in its dissociated colored form uniformly distributed in a film of transparent resin, portions of said film containing said dye in its colorless form and other portions of said film containing said dye in its colored form, said film being overcoated with film-forming resin containing flatting agent and an organic derivative of a group IV B metal capable of forming a chelate with said dye to render the clorless and colored portions of said film resistant to transformation between the colorless and colored conditions.

9. An alteration-resistant print comprising a sheet of paper coated with a photosensitive composition comprising colorless triphenylmethane leucocyanide dye and an agent for maintaining said dye in its dissociated colored form uniformly distributed in a film of transparent resin, portions of said film containing said dye in its colorless form and other portions of said film containing said dye in its colored form, said dye in both its colored and uncolored forms being chelated with tetra-substituted organic derivative of a group IV B metal to render the colorless and colored portions of said film resistant to transformation between the colorless and colored conditions.

10. An alteration-resistant print comprising a sheet of paper coated with a photosensitive composition comprising colorless triarylmethane leucocyanide dye and an agent for maintaining said dye in its dissociated colored form uniformly distributed in a film of transparent resin, portions of said film containing said dye in its colorless form and other portions of said film containing said dye in its colored form, said dye in both its colored and uncolored forms being reacted with tetra-ester having the formula:

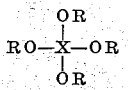

in which X is selected from the group consisting of titanium, zirconium, hafnium and mixtures thereof and R is an organic radical, to render the colorless and colored portions of said film resistant to transformation between the colorless and colored conditions.

11. A print as recited in claim 10 in which said tetra-ester is an organic titanate.

12. An alteration-resistant transparency comprising a sheet of clear plastic material coated with a photosensitive composition comprising colorless triarylmethane leucocyanide dye and an agent for maintaining said dye in its dissociated colored form, portions of said dye being in its colorless form and other portions of said dye being in its colored form, said dye being chelated with an organic derivative of a group IV B metal capable of forming a chelate with said dye to render the colorless and colored portions of said dye resistant to transformation between the colorless and colored conditions.

13. A process of producing a white print from a positive transparency comprising, exposing a transparent sheet including a colorless leucocyanide dye convertible by exposure to short wave length radiation from a colorless form to a colored form and an agent for maintaining said dye in its dissociated form to short wave length radiation through said positive transparency to thereby produce a negative transparency comprising short wave length transparent areas containing colorless dye and short wave length radiation absorbent areas containing colored dye, contacting the leucocyanide dye of said negative transparency with a group IV B metal organic tetra-ester to thereby render said dye resistant to further color transformation by exposure to short wave length radiation and provide an insensitized negative transparency, and then exposing a sheet of material carrying a photosensitive composition comprising colorless leucocyanide dye convertible by exposure to short wave length radiation from a colorless form to a colored form and an agent for maintaining said dye in its dissociated colored form to short wave length radiation through the said insensitized negative transparency to thereby form a white print corresponding with the original positive transparency.

References Cited by the Examiner

UNITED STATES PATENTS

| | | | |
|---|---|---|---|
| 2,324,060 | 7/43 | Boughton | 96—27 |
| 2,536,657 | 1/51 | Reese | 96—27 |
| 2,855,300 | 10/58 | Chalkley | 96—90 |
| 2,855,303 | 10/58 | Chalkley | 96—90 |
| 2,933,475 | 4/60 | Hoover et al. | |
| 3,008,858 | 11/61 | Blake et al. | 8—74 |
| 3,131,062 | 4/64 | Arguss | 96—90 |

OTHER REFERENCES

Blumenthal: American Dyestuff Reporter, vol. 37, (1948), pp. 285 and 286.

Martell et al.: Chemistry of Metal Compounds, published by Prentice-Hall, Inc., New York (1952), pp. 495–499.

NORMAN G. TORCHIN, *Primary Examiner.*

ABRAHAM H. WINKELSTEIN, *Examiner.*